US011174756B2

(12) United States Patent
Venter et al.

(10) Patent No.: US 11,174,756 B2
(45) Date of Patent: Nov. 16, 2021

(54) GAS TURBINE ENGINE AND METHOD FOR INTRODUCING OIL IN A GEARBOX ARRANGEMENT

(71) Applicant: Rolls-Royce Deutschland Ltd & Co KG, Blankenfelde-Mahlow (DE)

(72) Inventors: Gideon Daniel Venter, Berlin (DE); Christos Kallianteris, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 262 days.

(21) Appl. No.: 16/299,709

(22) Filed: Mar. 12, 2019

(65) Prior Publication Data

US 2019/0292945 A1 Sep. 26, 2019

(30) Foreign Application Priority Data

Mar. 20, 2018 (DE) ..................... 10 2018 106 488.8

(51) Int. Cl.
*F02C 7/36* (2006.01)
*F01D 25/20* (2006.01)
(Continued)

(52) U.S. Cl.
CPC ............. *F01D 25/20* (2013.01); *F01D 25/18* (2013.01); *F01D 25/183* (2013.01); *F02C 7/36* (2013.01);
(Continued)

(58) Field of Classification Search
CPC ........ F01D 25/18; F01D 25/20; F01D 25/183; F02C 7/36; F02C 7/32; F05D 2260/40311;
(Continued)

(56) References Cited

U.S. PATENT DOCUMENTS 3,495,471 A * 2/1970 Johnson .............. F16H 57/0456
74/467
6,409,464 B1 * 6/2002 Fisher ..................... F01D 25/16
384/475
(Continued)

FOREIGN PATENT DOCUMENTS

EP 3156759 A1 4/2017
EP 3179056 A2 6/2017
(Continued)

OTHER PUBLICATIONS

European Search Report dated Aug. 2, 2019 for counterpart European Patent Application No. EP19160523.7.
(Continued)

*Primary Examiner* — Woody A Lee, Jr.
*Assistant Examiner* — Behnoush Haghighian
(74) *Attorney, Agent, or Firm* — Shuttleworth & Ingersoll, PLC; Timothy J. Klima

(57) ABSTRACT

A gas turbine engine for an aircraft includes an engine core, a fan and a gearbox which receives an input from a turbine shaft and which outputs drive for the fan for driving the fan at a lower rotational speed than the turbine shaft. The gearbox has a sun gear which is driven by the turbine shaft. The turbine shaft and the sun gear form a spline connection which is lubricated with oil. The turbine shaft has, on its radially inner side, at least one indentation which is suitable for receiving oil, and the turbine shaft has at least one bore which extends from the indentation to the radially outer side of the turbine shaft and which is suitable for transporting oil from the at least one indentation to the radially outer side of the turbine shaft as the turbine shaft rotates.

20 Claims, 5 Drawing Sheets

(51) Int. Cl.
*F01D 25/18* (2006.01)
*F02K 3/06* (2006.01)
*F16D 3/06* (2006.01)
*F16D 3/84* (2006.01)
*F16H 57/04* (2010.01)

(52) U.S. Cl.
CPC ............... *F02K 3/06* (2013.01); *F16D 3/06* (2013.01); *F16D 3/84* (2013.01); *F16H 57/0486* (2013.01); *F05D 2220/323* (2013.01); *F05D 2260/40311* (2013.01); *F05D 2260/98* (2013.01); *F16D 2300/06* (2013.01)

(58) Field of Classification Search
CPC ............ F16H 57/0018; F16H 57/0482; F16H 57/0484; F16H 57/0486; F16H 57/0427; F16H 57/0428; F16D 3/06; F16D 3/84; F16D 2300/06; F02K 3/06
See application file for complete search history.

(56) References Cited

U.S. PATENT DOCUMENTS

| | | | | |
|---|---|---|---|---|
| 7,704,178 | B2 * | 4/2010 | Sheridan | F16H 57/0482 475/159 |
| 7,926,260 | B2 * | 4/2011 | Sheridan | F02C 7/36 60/226.1 |
| 8,256,318 | B2 * | 9/2012 | Vassaux | F16H 57/0431 74/468 |
| 8,484,942 | B1 * | 7/2013 | McCune | F16H 57/0486 60/39.08 |
| 8,667,688 | B2 * | 3/2014 | McCune | F02C 7/32 29/893.1 |
| 8,777,793 | B2 * | 7/2014 | Sheridan | F16C 23/045 475/160 |
| 9,194,255 | B2 * | 11/2015 | Sheridan | F16H 57/0486 |
| 9,476,321 | B2 * | 10/2016 | Haugh | F02C 7/14 |
| 9,541,007 | B2 * | 1/2017 | McCune | F01D 5/06 |
| 9,689,399 | B2 * | 6/2017 | Heitz | F01D 5/026 |
| 10,066,734 | B2 * | 9/2018 | Sheridan | F16H 57/0486 |
| 10,458,279 | B2 * | 10/2019 | Gedin | F02C 7/06 |
| 10,550,723 | B2 * | 2/2020 | Gedin | F16H 57/0479 |
| 10,605,112 | B2 * | 3/2020 | Lin | F02C 3/107 |
| 10,753,285 | B2 * | 8/2020 | McCune | F02C 3/107 |
| 2008/0093174 | A1 * | 4/2008 | Suciu | F02C 3/073 184/6.11 |
| 2009/0078075 | A1 * | 3/2009 | Vassaux | F16H 57/0431 74/468 |
| 2016/0003090 | A1 * | 1/2016 | Lin | F02C 7/36 60/39.08 |
| 2017/0102292 | A1 * | 4/2017 | Mastro | F01D 21/003 |
| 2017/0159798 | A1 * | 6/2017 | Sheridan | F01D 25/18 |
| 2018/0258794 | A1 * | 9/2018 | Gedin | F16H 57/0479 |
| 2019/0032514 | A1 * | 1/2019 | Gedin | F02C 7/36 |

FOREIGN PATENT DOCUMENTS

| | | |
|---|---|---|
| WO | 2017046481 A1 | 3/2017 |
| WO | 2017129926 A1 | 8/2017 |

OTHER PUBLICATIONS

German Search Report dated Jan. 7, 2019 from counterpart German Patent Application No. DE 10 2018 106 488.8.

* cited by examiner

GAS TURBINE ENGINE AND METHOD FOR INTRODUCING OIL IN A GEARBOX ARRANGEMENT

This application claims priority to German Patent Application DE102018106488.8 filed Mar. 20, 2018, the entirety of which is incorporated by reference herein.

The invention relates to a gas turbine and to a method for introducing oil into a gearbox arrangement It is known, in a geared turbofan engine, for the toothing region of a spline connection between drive shaft and sun gear of a planetary gearbox of the geared turbofan engine to be lubricated with oil. It is necessary here to ensure an adequate oil level in the toothing region. For this purpose, it is firstly necessary to seal off the toothing region by means of seal elements. It is secondly necessary to introduce oil into the toothing region during operation.

The present invention is based on the object of providing a gas turbine engine and a method which, in an effective manner, provide oil for ensuring an adequate oil level in the toothing region between a drive shaft and a sun gear.

Said object is achieved by means of a gas turbine engine having the features disclosed herein.

Accordingly, a first aspect of the invention relates to a gas turbine engine which has an engine core which comprises a turbine, a compressor and a turbine shaft which connects the turbine to the compressor. A fan is positioned upstream of the engine core, wherein the fan comprises multiple fan blades. Furthermore, a gearbox is provided which receives an input from the turbine shaft and which outputs drive for the fan for the purposes of driving the fan at a lower rotational speed than the core shaft. The gearbox has a sun gear, which is driven by the turbine shaft. The turbine shaft and the sun gear form a spline connection which is lubricated with oil.

Provision is made whereby the turbine shaft has, on its radially inner side averted from the spline connection, at least one indentation which is suitable for receiving oil, and the turbine shaft has at least one bore which extends from the indentation to the radially outer side of the turbine shaft and which is suitable for transporting oil from the at least one indentation to the radially outer side of the turbine shaft as the turbine shaft rotates.

The invention is based on the concept of introducing oil, utilizing centrifugal force, into a spline connection at a suitable location, wherein the oil is firstly introduced into an indentation which is formed on the radially inner side of the turbine shaft formed as a hollow shaft and is thus averted from the spline connection. As the turbine shaft rotates, the oil passes, owing to the centrifugal force acting on the oil, from the indentation to the radially outer side of the turbine shaft, and thus to the spline connection, via bores extending radially in the turbine shaft.

One refinement of the invention provides for the indentation to be formed by a groove which is continuous in a circumferential direction. This is however merely one exemplary embodiment. The indentation may basically assume a multiplicity of forms and refinements. For example, it is alternatively possible for multiple circular indentations to be formed in succession in the circumferential direction.

A further refinement of the invention provides for multiple bores to be provided which extend from the indentation to the radially outer side of the turbine shaft, wherein the bores are arranged for example equidistantly in the circumferential direction. Provision may also be made for multiple bores to be provided which are arranged one behind the other in an axial direction. The bores run in each case in a radial direction, or have at least a radial component.

A further refinement of the invention provides for the indentation to be positioned axially such that the at least one bore ends in a sealed-off region of the spline connection. In this way, the spline connection can be reliably provided with sufficient oil. Provision may be made here for the indentation to be situated axially between an axially front and an axially rear seal element of the spline connection. The seal elements are for example a front seal ring and a rear seal ring, which seal off the spline connection and ensure an adequate oil level of the spline connection. Here, one refinement provides for the at least one indentation to be formed in an axial direction in front of the toothing region of the spline connection.

In one refinement of the invention, the gas turbine engine furthermore comprises an oil applicator by means of which oil is introduced into the at least one indentation. The oil applicator is for example a spraying device which discharges an oil jet in targeted fashion.

One design variant in this regard provides for the oil applicator to be oriented and positioned such that oil is sprayed directly into the at least one indentation. Here, the oil applicator is in particular arranged adjacent to the open end side of the turbine shaft, such that oil can be sprayed in directly via the end side.

Another design variant in this regard provides for the oil applicator to be oriented and positioned such that oil is introduced indirectly into the at least one indentation. The oil is thus fed firstly to a different location and is introduced from there into the at least one indentation. The provision of oil by means of the oil applicator is realized here in turn for example from the open end side of the turbine shaft.

One exemplary embodiment in this regard provides for the oil applicator to be oriented and positioned such that oil is sprayed onto a shaft arranged radially inside the turbine shaft and rebounds or is centrifuged from the shaft into the at least one indentation. The shaft is a shaft running within the drive shaft. Such a shaft may be coupled to the fan, and may in particular be provided for accommodating axial forces, whereas the rotational drive of the fan is realized by the turbine shaft and the gearbox. Since the further shaft likewise rotates, the oil applied to the shaft is centrifuged radially outward, or rebounds on the shaft from the outset, and is thus fed to the at least one indentation of the turbine shaft.

One refinement in this regard provides for the shaft to likewise have an indentation, into which the oil applicator sprays oil, wherein the indentation of the shaft is situated, at the same axial position, radially opposite the indentation of the drive shaft. Said indentation is, in one exemplary embodiment, likewise formed as a groove. The indentation of the shaft serves for collecting, at a suitable axial position, the oil provided by the oil applicator. From the indentation of the further shaft, said oil is then centrifuged radially to the indentation of the drive shaft.

One refinement of the gas turbine engine provides for the turbine to be a first turbine, for the compressor to be a first compressor, and for the turbine shaft to be a first turbine shaft, for the engine core to furthermore comprise a second turbine, a second compressor and a second turbine shaft, which connects the second turbine to the second compressor, and for the second turbine, the second compressor and the second turbine shaft to be arranged so as to rotate at a higher rotational speed than the first turbine shaft.

In a further aspect of the invention, the present invention provides a gearbox arrangement which comprises a drive shaft, which is formed as a hollow shaft, and an output element, which is driven by the drive shaft. Here, the drive shaft and the output element are connected to one another by means of a shaft-hub connection, for example a spline connection, which is lubricated with oil. Provision is made for the drive shaft to have, on its radially inner side, at least one indentation which is suitable for receiving oil, and for the drive shaft to have at least one bore which extends from the indentation to the radially outer side of the drive shaft and which is suitable for transporting oil from the at least one indentation to the radially outer side of the drive shaft as the drive shaft rotates.

According to this aspect of the invention, provision is thus made for introducing oil, utilizing centrifugal force, into a shaft-hub connection at a suitable location, wherein the oil is firstly introduced into an indentation which is formed on the radially inner side of the drive shaft formed as a hollow shaft. As the drive shaft rotates, the oil passes, owing to the centrifugal force acting on the oil, from the indentation to the radially outer side of the drive shaft, and thus to the shaft-hub connection, via bores extending radially in the drive shaft.

Refinements of the gearbox arrangement have features further disclosed herein.

A further aspect of the present invention relates to a method for introducing oil into a gearbox arrangement which comprises a drive shaft, formed as hollow shaft, and an output element, which drive shaft and output element are connected to one another by means of a shaft-hub connection. The method has the steps:

introducing oil into at least one indentation which is formed on the radially inner side of the drive shaft, wherein the drive shaft has at least one bore which extends from the indentation to the radially outer side of the drive shaft, transporting oil from the at least one indentation through the at least one bore to the radially outer side of the drive shaft as the drive shaft rotates, wherein the oil is fed to a seal region in which the shaft-hub connection is sealed off.

It is pointed out that the present invention is described in relation to a cylindrical coordinate system which has the coordinates x, r and φ. Here, x denotes the axial direction, r denotes the radial direction and φ denotes the angles in a circumferential direction. Proceeding from the x axis, the radial direction points radially outward. Expressions such as "in front of", "behind", "front" and "rear" relate to the axial direction or to the flow direction in the engine. Expressions such as "outer" or "inner" relate to the radial direction.

As stated here at another point, the present disclosure may relate to a gas turbine engine. Such a gas turbine engine may comprise an engine core which comprises a turbine, a combustion chamber, a compressor and a core shaft which connects the turbine to the compressor. Such a gas turbine engine may comprise a fan (with fan blades) which is positioned upstream of the engine core.

Arrangements of the present disclosure may be advantageous in particular, but not exclusively, for fans which are driven by means of a gearbox. Correspondingly, the gas turbine engine may comprise a gearbox which receives an input from the core shaft and which outputs drive for the fan for the purposes of driving the fan at a lower rotational speed than the core shaft. The input for the gearbox may be taken directly from the core shaft or indirectly from the core shaft, for example via a spur shaft and/or a spur gear wheel. The core shaft may be rigidly connected to the turbine and to the compressor, such that the turbine and compressor rotate at the same rotational speed (wherein the fan rotates at a lower rotational speed).

The gas turbine engine which is disclosed herein may have any desired suitable general architecture. For example, the gas turbine engine may have any desired number of shafts which connect turbines and compressors, for example one, two or three shafts. Merely by way of example, the turbine connected to the core shaft may be a first turbine, the compressor connected to the core shaft may be a first compressor, and the core shaft may be a first core shaft. The engine core may furthermore comprise a second turbine, a second compressor and a second core shaft, which connects the second turbine to the second compressor. The second turbine, the second compressor and the second core shaft may be arranged so as to rotate at a higher rotational speed than the first core shaft.

In the case of such an arrangement, the second compressor may be positioned axially downstream of the first compressor. The second compressor may be arranged so as to receive (for example so as to directly receive, for example via a generally ring-shaped channel) flow from the first compressor.

The gearbox may be arranged so as to be driven by that core shaft which is configured to rotate (for example during use) at the lowest rotational speed (for example the first core shaft in the above example). For example, the gearbox may be arranged so as to be driven only by that core shaft which is configured to rotate (for example during use) at the lowest rotational speed (for example only by the first core shaft and not by the second core shaft in the above example). Alternatively, the gearbox may be arranged so as to be driven by one or more shafts, for example the first and/or the second shaft in the above example.

In the case of a gas turbine engine which is described and/or claimed here, a combustion chamber may be provided axially downstream of the fan and of the compressor (of the compressors). For example, the combustion chamber may be situated directly downstream of the second compressor (for example at the outlet thereof) if a second compressor is provided. As a further example, the flow at the outlet of the compressor may be fed to the inlet of the second turbine, if a second turbine is provided. The combustion chamber may be provided upstream of the turbine (of the turbines).

The or each compressor (for example the first compressor and the second compressor as per the above description) may comprise any desired number of stages, for example multiple stages. Each stage may comprise a row of rotor blades and a row of stator blades, which may be variable stator blades (in the sense that their angle of incidence may be variable). The row of rotor blades and the row of stator blades may be axially offset with respect to one another.

The or each turbine (for example the first turbine and the second turbine as per the above description) may have any desired number of stages, for example multiple stages. Each stage may comprise a row of rotor blades and a row of stator blades. The row of rotor blades and the row of stator blades may be axially offset with respect to one another.

Each fan blade may be defined with a radial span which extends from a root (or a hub) at a radially inner point which is flowed over by gas, or at a position of a span width of 0%, to a tip at a position of a span width of 100%. The ratio of the radius of the fan blade at the hub to the radius of the fan blade at the tip may be less than (or in the region of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may lie in an inclusive range bounded by two of the values in the preceding sentence (that is to say the values may form upper or lower limits). These ratios may generally be referred to as hub-tip ratio. The radius at the hub and the radius at the tip may both be measured from the front edge part (or the edge situated axially furthest forward) of the blade. The hub-tip ratio self-evidently relates to that portion of the fan blade which is flowed over by gas, that is to say the portion situated radially outside any platform.

The radius of the fan may be measured between the centerline of the engine and the tip of the fan blade at its leading edge. The diameter of the fan (which may be simply twice the radius of the fan) may be greater than (or in the region of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches) or 390 cm (approximately 155 inches). The fan diameter may lie in an inclusive range bounded by two of the values in the preceding sentence (that is to say the values may form upper or lower limits).

The rotational speed of the fan may vary during use. In general, the rotational speed is lower for fans with a larger diameter. Merely as a non-limiting example, the rotational speed of the fan under constant speed conditions may be less than 2500 rpm, for example less than 2300 rpm. Merely as a further non-limiting example, it is also possible for the rotational speed of the fan under constant speed conditions for an engine with a fan diameter in the range from 250 cm to 300 cm (for example 250 cm to 280 cm) to lie in the range from 1700 rpm to 2500 rpm, for example in the range from 1800 rpm to 2300 rpm, for example in the range from 1900 rpm to 2100 rpm. Merely as a further non-limiting example, the rotational speed of the fan under constant speed conditions for an engine with a fan diameter in the range from 320 cm to 380 cm may lie in the range from 1200 rpm to 2000 rpm, for example in the range from 1300 rpm to 1800 rpm, for example in the range from 1400 rpm to 1600 rpm.

During the use of the gas turbine engine, the fan (with associated fan blades) rotates about an axis of rotation. This rotation has the result that the tip of the fan blades moves at a speed $U_{tip}$. The work performed by the fan blades on the flow results in an increase in the enthalpy dH of the flow. A fan tip load may be defined as $dH/U_{tip}^2$, wherein dH is the enthalpy increase (for example the average 1-D enthalpy increase) across the fan and $U_{tip}$ is the (translational) speed of the fan tip, for example at the leading edge of the tip (which can be defined as the fan tip radius at the leading edge multiplied by the angular speed). The fan tip load under constant speed conditions may amount to more than (or may lie in the region of): 0.3, 0.31, 0.32, 0.33, 0.34, 0.35, 0.36, 0.37, 0.38, 0.39 or 0.4 (wherein all units in this section are $Jkg^{-1}K^{-1}/(ms^{-1})^2$). The fan tip load may lie in an inclusive range bounded by two of the values in the preceding sentence (that is to say the values may form upper or lower limits).

Gas turbine engines according to the present disclosure may have any desired bypass ratio, wherein the bypass ratio is defined as the ratio of the mass throughput of the flow through the bypass channel to the mass throughput of the flow through the core under constant speed conditions. In the case of some arrangements, the bypass ratio may amount to more than (or lie in the region of): 10, 10.5, 11, 11.5, 12, 12.5, 13, 13.5, 14, 14.5, 15, 15.5, 16, 16.5 or 17. The bypass ratio may lie in an inclusive range bounded by two of the values in the preceding sentence (that is to say the values may form upper or lower limits). The bypass channel may be substantially ring-shaped. The bypass channel may be situated radially outside the engine core. The radially outer surface of the bypass channel may be defined by an engine nacelle and/or a fan housing.

The total pressure ratio of a gas turbine engine which is described and/or claimed here may be defined as the ratio of the dynamic pressure upstream of the fan to the dynamic pressure at the outlet of the very-high-pressure compressor (upstream of the inlet into the combustion chamber). As a non-limiting example, the total pressure ratio of a gas turbine engine which is described and/or claimed here under constant speed conditions may amount to (or lie in the region of): 35, 40, 45, 50, 55, 60, 65, 70, 75. The total pressure ratio may lie in an inclusive range bounded by two of the values in the preceding sentence (that is to say the values may form upper or lower limits).

The specific thrust of an engine may be defined as the net thrust of the engine divided by the total mass flow through the engine. Under constant speed conditions, the specific thrust of an engine which is described and/or claimed here may amount to less than (or lie in the region of): 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may lie in an inclusive range bounded by two of the values in the preceding sentence (that is to say the values may form upper or lower limits). Such engines may be particularly efficient in relation to conventional gas turbine engines.

A gas turbine engine which is described and/or claimed here may have any desired maximum thrust. Merely as a non-limiting example, a gas turbine which is described and/or claimed here may be capable of generating a maximum thrust of at least (or in the region of): 160 kN, 170 kN, 180 kN, 190 kN, 200 kN, 250 kN, 300 kN, 350 kN, 400 kN, 450 kN, 500 kN or 550 kN. The maximum thrust may lie in an inclusive range bounded by two of the values in the preceding sentence (that is to say the values may form upper or lower limits). The thrust referred to above may be the net maximum thrust under standard atmospheric conditions at sea level plus 15 degrees C. (ambient pressure 101.3 kPa, temperature 30 degrees C.) in the case of a static engine.

During use, the temperature of the flow at the inlet of the high-pressure turbine may be particularly high. This temperature, referred to as TET, may be measured at the outlet to the combustion chamber, for example directly upstream of the first turbine blade, which can in turn be referred to as a nozzle guide blade. Under constant speed conditions, the TET may amount to at least (or lie in the region of): 1400 K, 1450 K, 1500 K, 1550 K, 1600 K or 1650 K. The TET under constant speed conditions may lie in an inclusive range bounded by two of the values in the preceding sentence (that is to say the values may form upper or lower limits). The maximum TET during the use of the engine may for example amount to at least (or lie in the region of): 1700 K, 1750 K, 1800 K, 1850 K, 1900 K, 1950 K or 2000 K. The maximum TET may lie in an inclusive range bounded by two of the values in the preceding sentence (that is to say the values may form upper or lower limits). The maximum TET may arise for example under conditions of high thrust, for example under MTO (Maximum Take-Off thrust) conditions.

A fan blade and/or an airfoil portion of a fan blade which is described and/or claimed here may be produced from any desired suitable material or from a combination of materials.

For example, at least a part of the fan blade and/or of the airfoil may be produced at least partially from a composite material, for example a metal matrix composite material and/or a composite material with organic matrix, for example carbon fiber. As a further example, at least a part of the fan blade and/or of the airfoil may be produced at least partially from a metal, for example a titanium-based metal or an aluminum-based material (for example an aluminum-lithium alloy) or a steel-based material. The fan blade may comprise at least two regions which are produced using different materials. For example, the fan blade may have a leading protective edge which is produced using a material which can better resist impacts (for example of birds, ice or other material) than the rest of the blade. Such a leading edge may for example be produced using titanium or a titanium-based alloy. Thus, the fan blade may, merely as one example, have a body based on carbon fiber or aluminum (for example an aluminum-lithium alloy) with a leading edge composed of titanium.

A fan which is described and/or claimed here may comprise a central portion from which the fan blades may extend, for example in a radial direction. The fan blades may be attached in any desired manner to the central portion. For example, each fan blade may comprise a fixing device which can enter into engagement with a corresponding slot in the hub (or disk). Merely as one example, such a fixing device may be present in the form of a dovetail, which, for the purposes of fixing the fan blade to the hub/disk, can be inserted into, and/or placed in engagement with, a corresponding slot in the hub/disk. As a further example, the fan blades may be formed integrally with a central portion. Such an arrangement can be regarded as a Blisk or a Bling. Any suitable method may be used for producing such a Blisk or such a Bling. For example, at least a part of the fan blades may be machined from a block, and/or at least a part of the fan blades may be attached to the hub/disk by welding, such as for example linear friction welding.

The gas turbine engines which are described and/or claimed here may or may not be equipped with a VAN (variable area nozzle—nozzle with variable cross section). Such a nozzle with variable cross section can permit a variation of the outlet cross section of the bypass channel. The general principles of the present disclosure can apply to engines with or without a VAN.

The fan of a gas turbine which is described and/or claimed here may have any desired number of fan blades, for example 16, 18, 20 or 22 fan blades.

"In accordance with the present use" may mean constant speed conditions of an aircraft on which the gas turbine engine is installed. Such constant speed conditions may conventionally be defined as the conditions during the middle part of the flight, for example the conditions to which the aircraft and/or the engine are/is exposed between (in respect of time and/or distance) the end of the ascent and the start of the descent.

Merely as one example, the forward speed under constant speed conditions may lie at any desired point in the range from Mach 0.7 to 0.9, for example 0.75 to 0.85, for example 0.76 to 0.84, for example 0.77 to 0.83, for example 0.78 to 0.82, for example 0.79 to 0.81, for example in the region of Mach 0.8, in the region of Mach 0.85 or in the range from 0.8 to 0.85. The constant travel condition may be any desired speed within these ranges. In the case of some aircraft, the constant travel conditions may lie outside these ranges, for example below Mach 0.7 or above Mach 0.9.

Merely as one example, the constant speed conditions may correspond to standard atmospheric conditions at an altitude which lies in the range from 10,000 m to 15,000 m, for example in the range from 10,000 m to 12,000 m, for example in the range from 10,400 m to 11,600 m (approximately 38,000 feet), for example in the range from 10,500 m to 11,500 m, for example in the range from 10,600 m to 11,400 m, for example in the range from 10,700 m (approximately 35,000 feet) to 11,300 m, for example in the range from 10,800 m to 11,200 m, for example in the range from 10,900 m to 11,100 m, for example in the region of 11,000 m. The constant speed conditions may correspond to standard atmospheric conditions at any desired height in these ranges.

Merely as one example, the constant speed conditions may correspond to the following: a forward Mach number of 0.8; a pressure of 23,000 Pa and a temperature of −55 degrees C.

Where used throughout this document, "constant speed" or "constant speed conditions" may mean the aerodynamic design point. Such an aerodynamic design point (or ADP) may correspond to the conditions (including for example the Mach number, ambient conditions and thrust requirement) for which the fan operation is configured. This may for example mean the conditions at which the fan (or the gas turbine engine) has the optimum efficiency in terms of construction.

During use, a gas turbine engine which is described and/or claimed here may be operated under the constant speed conditions which are defined here at another point. Such constant speed conditions may be determined by the constant speed conditions (for example the conditions during the middle part of the flight) of an aircraft to which at least one (for example 2 or 4) gas turbine engines may be fastened for the purposes of providing thrust.

It is self-evident to a person skilled in the art that a feature or parameter described with regard to one of the above aspects is applicable to any other desired aspect unless these are mutually exclusive. Furthermore, any desired feature or any desired parameter described here is applicable to any desired aspect and/or combinable with any other feature or parameter described here unless these are mutually exclusive.

The invention will be discussed in more detail below with reference to the figures of the drawing and on the basis of multiple exemplary embodiments. In the drawing.

Figure 5:
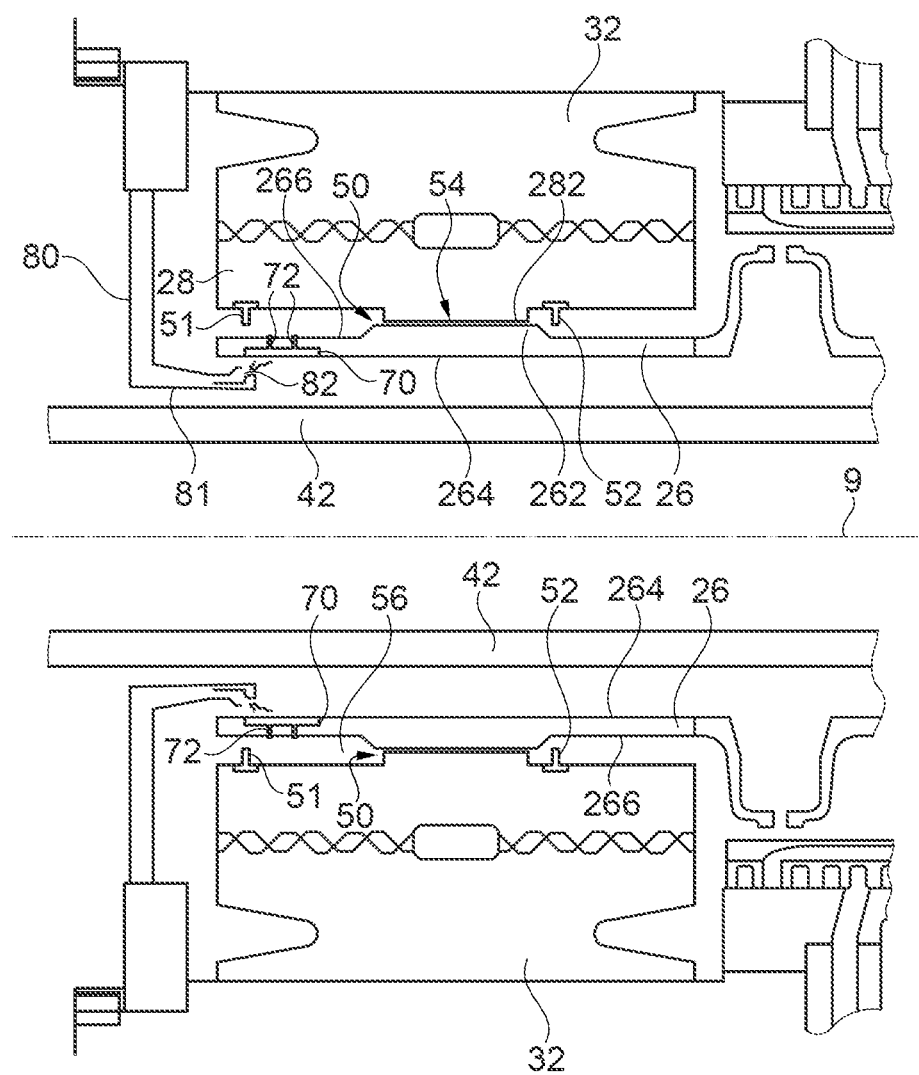
Figure 6:
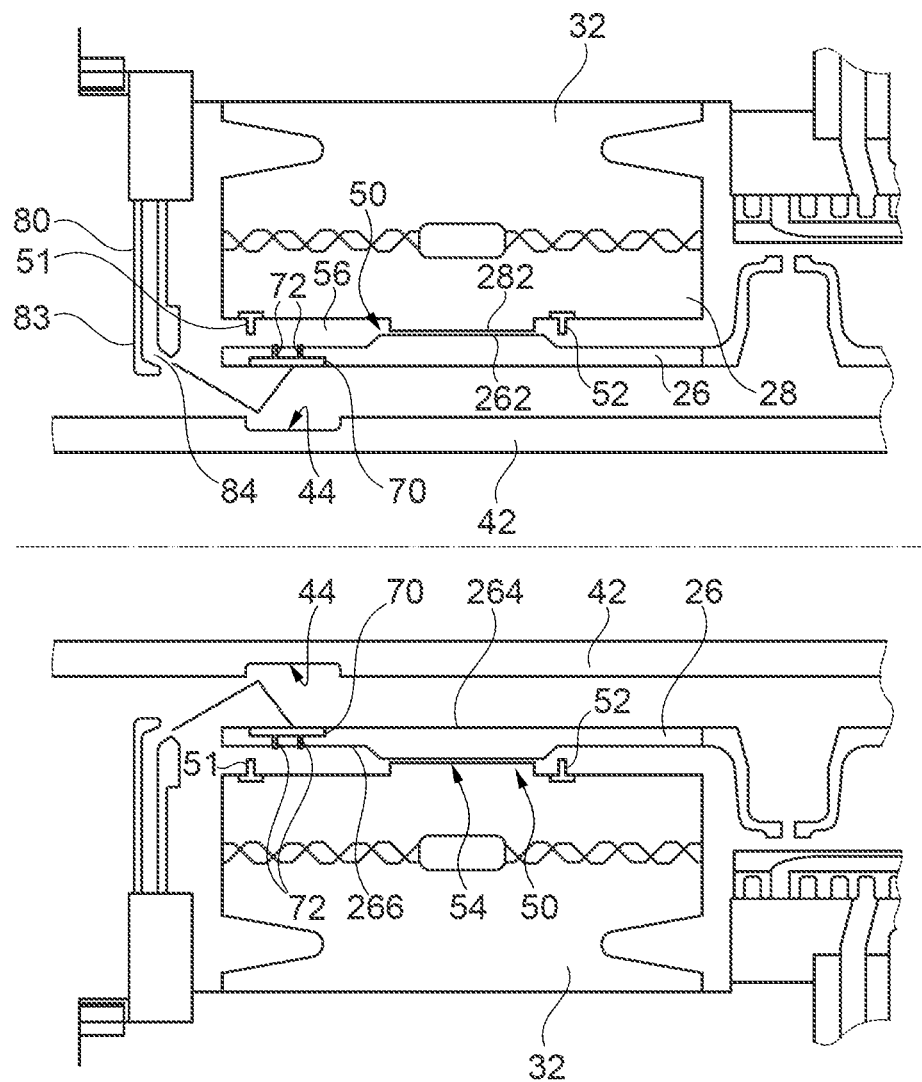

FIG. 5 shows a first exemplary embodiment of an arrangement for introducing oil into a spline connection between a drive shaft and a sun gear, wherein oil is introduced via an indentation formed radially at the inside in the drive shaft, and via radial bores extending from said indentation, into the spline connection, and wherein the oil is fed by means of an oil applicator directly to the indentation; and FIG. 6 shows a second exemplary embodiment of an arrangement for introducing oil into a spline connection between a drive shaft and a sun gear, wherein oil is introduced via an indentation formed radially at the inside in the drive shaft, and via radial bores extending from said indentation, into the spline connection, and wherein the oil is fed by means of an oil applicator indirectly to the indentation.

Figure 1:
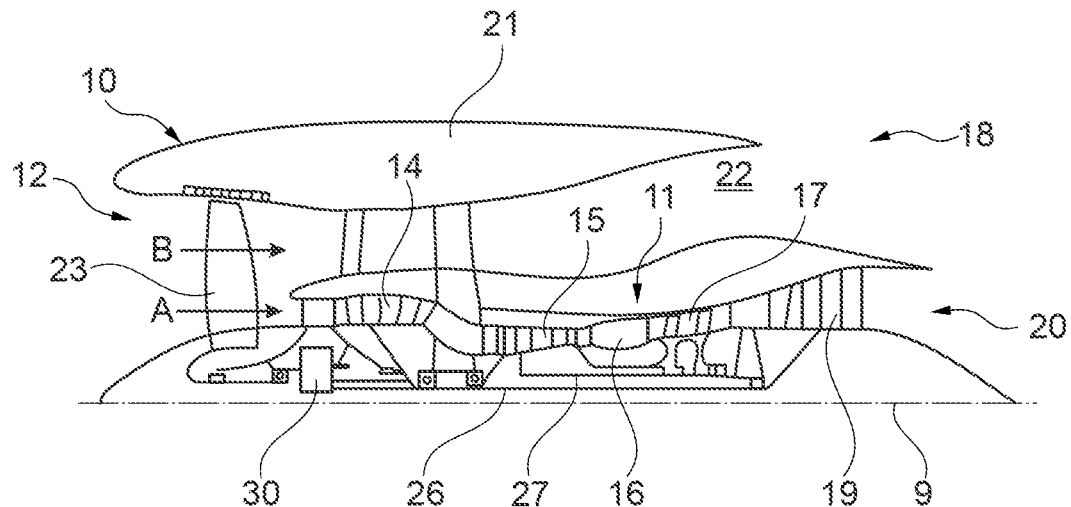
FIG. 1 shows a sectional side view of a gas turbine engine.

FIG. 1 illustrates a gas turbine engine 10 with a main axis of rotation 9. The engine 10 comprises an air inlet 12 and a thrust fan or fan 23 which generates two air streams: a core air stream A and a bypass air stream B. The gas turbine engine 10 comprises a core 11, which receives the core air stream A. The engine core 11 comprises, in an axial flow sequence, a low-pressure compressor 14, a high-pressure compressor 15, a combustion device 16, a high-pressure turbine 17, a low-pressure turbine 19 and a core thrust nozzle 20. An engine nacelle 21 surrounds the gas turbine engine 10 and defines a bypass channel 22 and a bypass thrust nozzle 18. The bypass air stream B flows through the bypass channel 22. The fan 23 is attached via a shaft 26 and an epicyclic gearbox 30 to the low-pressure turbine 19, and is driven by the latter.

During use, the core air stream A is accelerated and compressed by the low-pressure compressor 14 and conducted into the high-pressure compressor 15, where a further compression takes place. The compressed air discharged from the high-pressure compressor 15 is conducted into the combustion device 16, where said air is mixed with fuel and the mixture is burned. The resulting hot combustion products then expand through the high-pressure and low-pressure turbines 17, 19 and thus drive these before being discharged, so as to provide a thrust force, through the nozzle 20. The high-pressure turbine 17 drives the high-pressure compressor 15 by means of a suitable connecting shaft 27. The fan 23 generally provides the main part of the thrust force. The epicyclic gearbox 30 is a reduction gearbox.

Figure 2:
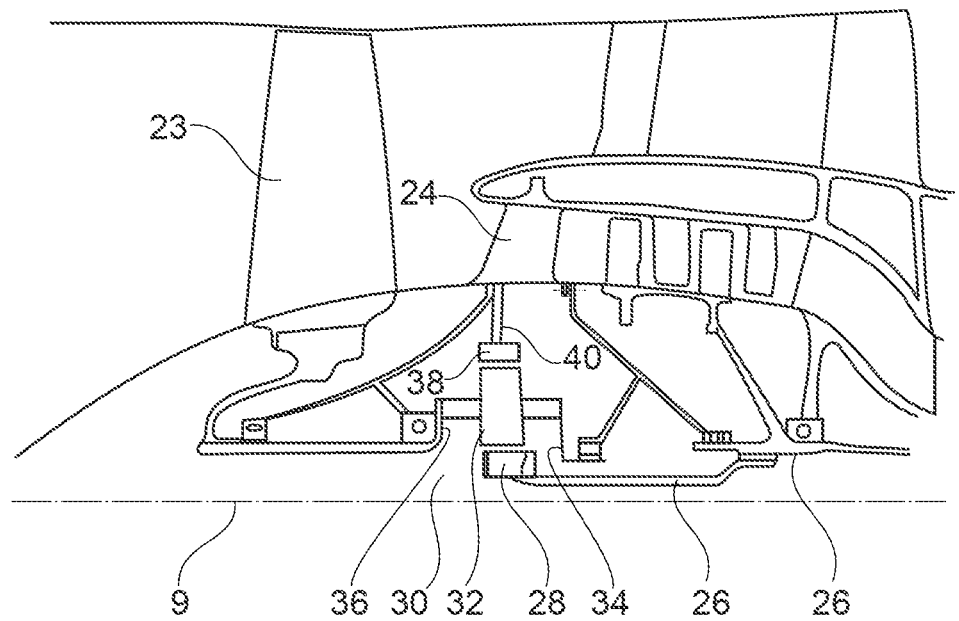
FIG. 2 shows an enlarged sectional side view of an upstream portion of a gas turbine engine.

An exemplary arrangement for a geared turbofan gas turbine engine 10 is shown in FIG. 2. The low-pressure turbine 19 (see FIG. 1) drives the shaft 26, which is coupled to a sun gear 28 of the epicyclic gearbox arrangement 30. Multiple planet gears 32, which are coupled to one another by means of a planet carrier 34, are situated radially outside the sun gear 28 and mesh with the latter. The planet carrier 34 restricts the planet gears 32 to revolving synchronously about the sun gear 28, while enabling each planet gear 32 to rotate about its own axis. The planet carrier 34 is coupled by means of a linkage 36 to the fan 23 so as to drive the rotation thereof about the engine axis 9. An outer gear or ring gear 38, which is coupled by means of linkage 40 to a static support structure 24, is situated radially outside the planet gears 32 and meshes with the latter.

It is pointed out that the expressions "low-pressure turbine" and "low-pressure compressor" as used here may be regarded as meaning the turbine stage with the lowest pressure or the compressor stage with the lowest pressure (that is to say not including the fan 23) and/or the turbine stage and compressor stage which are connected to one another by the connecting shaft 26 with the lowest rotational speed in the engine (that is to say not including the gearbox output shaft which drives the fan 23). In some documents, the "low-pressure turbine" and the "low-pressure compressor" referred to here may alternatively be known as the "medium-pressure turbine" and "medium-pressure compressor". With the use of such alternative nomenclature, the fan 23 may be referred to as a first compression stage or compression stage with the lowest pressure.

Figure 3:
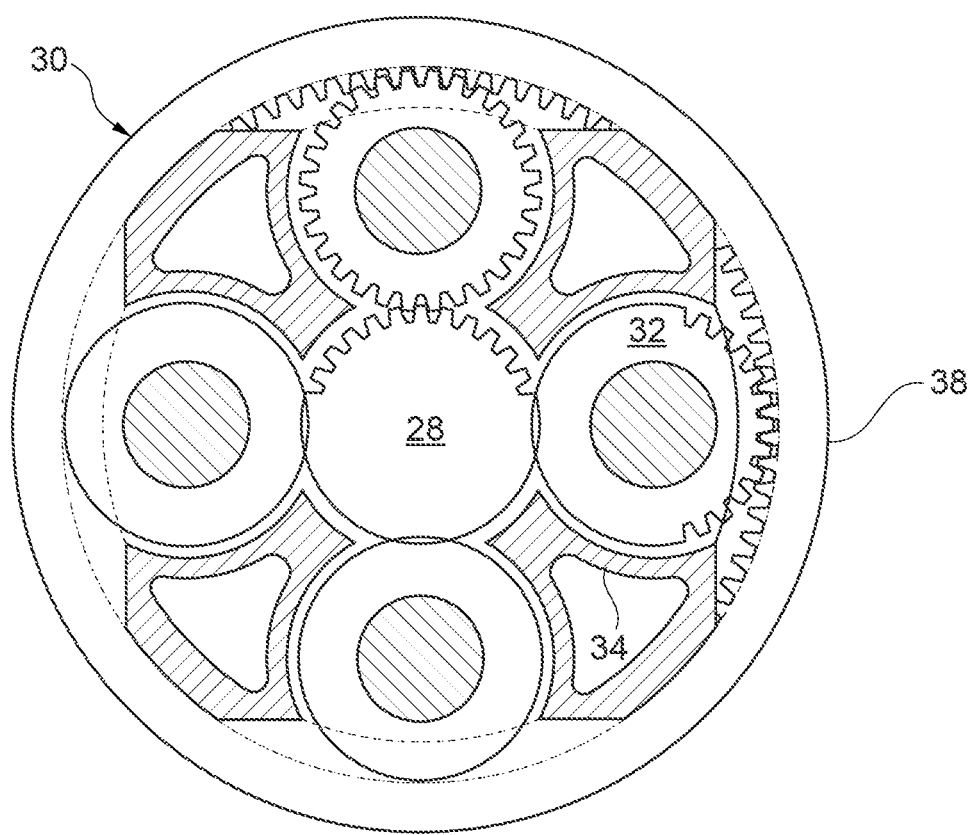
FIG. 3 shows a partially cut-away view of a gearbox for a gas turbine engine.

The epicyclic gearbox 30 will be shown in more detail by way of example in FIG. 3. The sun gear 28, the planet gears 32 and the ring gear 38 each comprise teeth around the periphery thereof for the purposes of meshing with the other gearwheels. However, for the sake of clarity, only exemplary portions of the teeth are illustrated in FIG. 3. Although four planet gears 32 are illustrated, it is self-evident to a person skilled in the art that it is also possible for more or fewer planet gears 32 to be provided within the scope of protection of the claimed invention. Practical applications of an epicyclic gearbox 30 generally comprise at least three planet gears 32.

The epicyclic gearbox 30 illustrated by way of example in FIGS. 2 and 3 is a planetary gearbox, in which the planet carrier 34 is coupled by means of linkage 36 to an output shaft, wherein the internal gear 38 is fixed. However, any other desired suitable type of epicyclic gearbox 30 may be used. As a further example, the epicyclic gearbox 30 may be a star arrangement, in which the planet carrier 34 is held fixed, wherein it is made possible for the internal gear (or outer gear) 38 to rotate. In the case of such an arrangement, the fan 23 is driven by the internal gear 38. As a further alternative example, the gearbox 30 may be a differential gearbox, in the case of which it is made possible for both the internal gear 38 and the planet carrier 34 to rotate.

It is self-evident that the arrangement shown in FIGS. 2 and 3 is merely an example, and various alternatives lie within the scope of protection of the present disclosure. Merely by way of example, any desired suitable arrangement may be used for the positioning of the gearbox 30 in the engine 10 and/or for the connection of the gearbox 30 to the engine 10. As a further example, the connections (for example the linkages 36, 40 in the example of FIG. 2) between the gearbox 30 and other parts of the engine 10 (such as for example the input shaft 26, the output shaft and the fixed structure 24) may have a certain degree of stiffness or flexibility. As a further example, any desired suitable arrangement of the bearings between rotating and static parts of the engine (for example between the input and the output shaft of the gearbox and the fixed structures, such as for example the gearbox housing) may be used, and the disclosure is not restricted to the exemplary arrangement of FIG. 2. For example, it is readily apparent to persons skilled in the art that the arrangement of output and support linkages and bearing positions in the case of a star arrangement (described above) of the gearbox 30 would generally differ from those shown by way of example in FIG. 2.

Correspondingly, the present disclosure extends to a gas turbine engine with any desired arrangement of the gearbox types (for example star-shaped or planet type), support structures, input and output shaft arrangement and bearing positions.

The gearbox may optionally drive secondary and/or alternative components (for example the medium-pressure compressor and/or a post-compressor).

Other gas turbine engines to which the present disclosure is applicable may have alternative configurations. For example, such engines may have an alternative number of compressors and/or turbines and/or an alternative number of connecting shafts. As a further example, the gas turbine engine shown in FIG. 1 has a split flow nozzle 20, 22, which means that the flow through the bypass channel 22 has its own dedicated nozzle, which is separate from, and radially to the outside of, the engine core nozzle 20. This is however not limiting, and any aspect of the present disclosure may also apply to engines in the case of which the flow through the bypass channel 22 and the flow through the core 11 are mixed or combined before (or upstream of) a single nozzle, which can be referred to as a mixed flow nozzle. One or both nozzles (whether mixed or split flow) may have a fixed or variable area. Although the described example relates to a turbofan engine, the disclosure is applicable for example to any desired type of gas turbine engine, for example to an open-rotor engine (in which the fan stage is not surrounded by an engine nacelle) or a turboprop engine. In the case of some arrangements, the gas turbine engine 10 possibly does not comprise a gearbox 30.

The geometry of the gas turbine engine 10 and components thereof is defined using a conventional axis system which has an axial direction (which is aligned with the axis of rotation 9), a radial direction (in the direction from bottom to top in FIG. 1) and a circumferential direction (perpendicular to the view in FIG. 1). The axial, radial and circumferential directions run perpendicular to one another.

Figure 4:
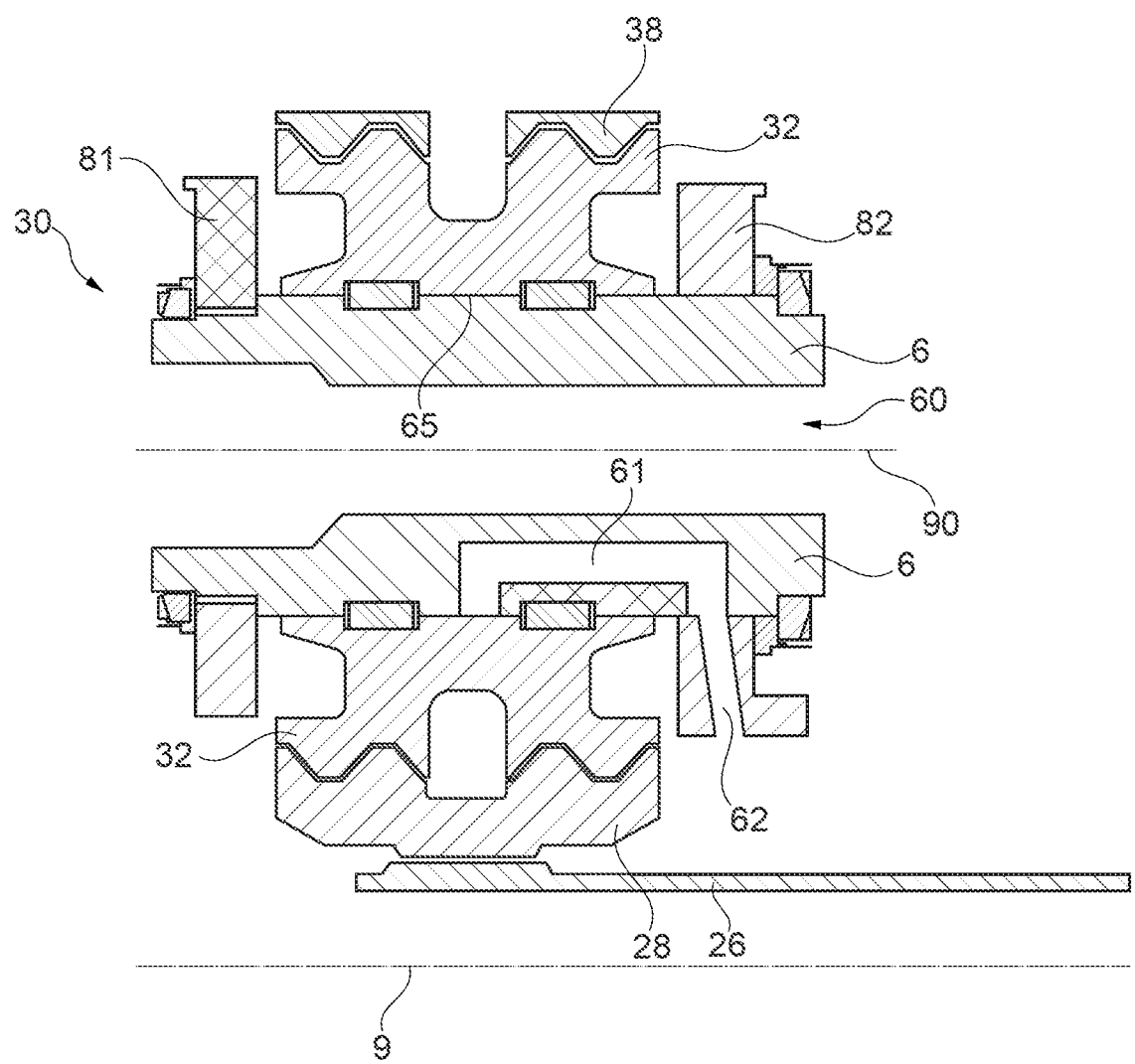
FIG. 4 is a sectional illustration of elements of a planetary gearbox suitable for use in a gas turbine engine as per FIG. 1.

FIG. 4 shows a further exemplary embodiment of a planetary gearbox of a gas turbine engine 10 designed as a geared turbofan engine as per FIG. 1 in a sectional illustration. The planetary gearbox 30 comprises a sun gear 28, which is driven by a drive shaft or sun shaft 26. Here, the drive shaft 26 is the shaft 26 of FIGS. 1 and 2, or generally a turbine shaft. The sun gear 28 and the drive shaft 26 rotate about the axis of rotation 9. The axis of rotation of the planetary gearing 30 is identical to the axis of rotation 9 or machine axis of the gas turbine engine 10.

The planetary gearbox 30 furthermore comprises a multiplicity of planet gears 32, one of which is illustrated in the sectional illustration of FIG. 4. The sun gear 28 drives the multiplicity of planet gears 32, wherein a toothing of the sun gear 28 meshes with a toothing of the planet gear 32.

The planet gear 32 is of hollow cylindrical form and forms an outer shell surface and an inner shell surface. The planet gear 32—driven by the sun gear 28—rotates about an axis of rotation 90 which runs parallel to the axis of rotation 9. The outer shell surface of the planet gear 32 forms a toothing which meshes with the toothing of an internal gear 38. The internal gear 38 is arranged so as to be static, that is to say so as not to rotate. The planet gears 32, owing to their coupling to the sun gear 28, rotate and in so doing travel along the circumference of the internal gear 38. The rotation of the planet gears 32 along the circumference of the internal gear 38, and in this case about the axis of rotation 90, is slower than the rotation of the drive shaft 26, whereby a speed reduction ratio is provided.

The planet gear 32 has, adjacent to its inner shell surface, a centered axial opening. A planet pin 6 is inserted into the opening, which planet pin itself also has an axial bore 60, wherein the planet pin 6 and the planet gear 32, at their surfaces facing toward one another, form a bearing 65, for example a rolling bearing or a plain bearing.

FIG. 4 furthermore shows a front carrier plate 81 and a rear carrier plate 82. The planet pin 6 is fastened to the front carrier plate 81 and to the rear carrier plate 82, for example is screwed or welded thereto. For example, the front carrier plate 81 is connected to a torque carrier, which is coupled to the fan shaft.

For the lubrication of the bearing 65 between planet pin 6 and the planet gear 32, an oilfeed device is provided, which comprises an oil feed channel 62 via which oil of a circulating oil system is conducted into lubricating film openings 61 in the planet pin 6.

The drive shaft 26 and the sun gear 28 form a spline connection, which is lubricated with oil. In the context of the present invention, the introduction of oil into the spline connection is of importance.

In this regard, FIG. 5 shows a first exemplary embodiment. The drive shaft 26 forms an external spline toothing 262 and the sun gear 28 forms an internal spline toothing 282, wherein the external spline toothing 262 and the internal spline toothing 282 form a spline connection 50. This is lubricated with oil. For this purpose, sealing means in the form of an axially front seal ring 51 and an axially rear seal ring 52 are provided, which are arranged spaced apart from the toothing region 54 itself in which the respective toothings 262, 282 are in meshing engagement. The seal rings 51, 52 seal off the spline connection 50.

To maintain an adequate oil level in the spline toothing 50, it is furthermore necessary for oil to be introduced into the spline connection 50 during operation. For this purpose, the following arrangement is provided.

The drive shaft 26, which is designed as a hollow shaft, has a radially inner side 264 and a radially outer side 266. The radially inner side 264 is averted from the spline connection 50. The radially outer side 266 forms the external spline toothing 262.

At its radially inner side 264, the driveshaft forms a depression or indentation 70. The indentation 70 is formed as a groove which extends continuously in a circumferential direction of the drive shaft 26. The indentation 70 may however be formed in some other way, for example by circular depressions distributed along the circumference. The groove 70 has, for example as illustrated, a rectangular cross section. Alternatively, the groove 70 has a non-rectangular cross section, for example a U-shaped cross section.

Furthermore, holes or bores 72 are provided which extend in the drive shaft in a radial direction from the indentation 70 to the radially outer side 266 of the drive shaft 26. Provision may be made here for a multiplicity of such bores 72 to be provided, wherein the bores are for example distributed equidistantly in the circumferential direction. Furthermore, provision may be made for multiple bores to be arranged one behind the other in an axial direction. Accordingly, FIG. 5 shows two bores 72 arranged one behind the other in the axial direction, which bores each extend from the indentation 70 to the radially outer side 266 of the drive shaft 26.

The described construction has the effect that, as the drive shaft 26 rotates, oil that has been introduced into the depression 70 is transported, owing to the centrifugal force, through the bores 72 into the axially front intermediate region 56 between the drive shaft 26 and the sun gear 28. The axial position of the indentation 70 and of the bores 72 is in this case such that these are situated in the axial direction between the axially front seal ring 52 and the toothing region of the spline connection 50. The oil thus passes through the bores 72 into a seal region of the spline connection 50, in which the spline connection 50 is sealed off.

The diameter of the bores 72 is dimensioned such that, as the drive shaft 26 rotates during the operation of the aircraft engine, the spline connection 50 is adequately supplied with oil.

FIG. 5 furthermore shows a further shaft 42 which runs radially within the drive shaft 26. This is for example a shaft which is coupled to the fan and which is designed to accommodate axial forces (so-called "thrust shaft").

For the filling of the indentation 70 with oil, an oil applicator 80 is provided which comprises an applicator arm 81 with an oil outlet opening 82. Here, the applicator arm 81 projects at an end side into the region between the further shaft 42 and the drive shaft 26. Here, the oil outlet opening 82 is positioned such that, via the latter, an oil jet can be applied directly into the indentation 70.

FIG. 6 shows a further exemplary embodiment, which differs from the exemplary embodiment of FIG. 5 by the nature of the provision of the oil in the indentation 70. Aside from this, the exemplary embodiment of FIG. 6 corresponds to the exemplary embodiment of FIG. 5, such that reference is thus made to the statements relating to the exemplary embodiment of FIG. 5.

In the exemplary embodiment of FIG. 6, provision is made for the oil to be applied by the oil applicator 80 initially to the further shaft 42. Here, it is not necessary for an applicator arm of the oil applicator to project at an end side into the shaft arrangement. In the exemplary embodiment of FIG. 6, the applicator arm 83 of the oil applicator 80 is arranged axially in front of the drive shaft 26. Said applicator arm has an oil outlet opening 84 which discharges an oil jet obliquely in the direction of the shaft 42. Provision is made here for the shaft 42 to likewise have an indentation 44, into which the oil applicator 80 sprays oil. The indentation 44 of the shaft 42 is in this case formed at the same axial position as the indentation 72 of the drive shaft 26.

The function of the oil application is such that, by means of the indentation 44, the oil initially collects at the desired axial position in the shaft 42. As a result of the rotation of the shaft 42, the oil is then centrifuged away from the shaft 42 in the direction of the indentation 70 of the drive shaft 26. From the indentation 70, said oil is transported in the described manner via the holes or bores 72 into the sealed region of the spline toothing 50.

A variant of the exemplary embodiment of FIG. 6 provides for the shaft 42 to have no indentation 44. In the case of precise spraying of an oil jet onto the shaft 42, it is nevertheless the case that centrifuging in the direction of the indentation 70 takes place at the correct axial position.

It is self-evident that the invention is not restricted to the embodiments described, and various modifications and improvements may be made without departing from the concepts described here. Any of the features may be used separately or in combination with any other features, unless these are mutually exclusive, and the disclosure extends to, and encompasses, all combinations and sub-combinations of one or more features described here. Where ranges are defined, these encompass all values within said ranges and all sub-ranges that fall within a range.

The invention claimed is:

1. A gas turbine engine for an aircraft, comprising:
   an engine core further comprising:
     a turbine;
     a compressor; and
     a turbine shaft which connects the turbine to the compressor and wherein the turbine shaft is a hollow shaft;
   a fan which is positioned upstream of the engine core, wherein the fan includes a plurality of fan blades; and
   a gearbox which receives an input from the turbine shaft and which outputs a drive for the fan to drive the fan at a lower rotational speed than the turbine shaft, wherein the gearbox includes a sun gear which is driven by the turbine shaft;
   a spline connection connecting the turbine shaft and the sun gear, wherein the spline connection is lubricated with oil;
   wherein the turbine shaft further comprises:
     an indentation on a radially inner side of the turbine shaft for receiving oil;
     at least one bore which extends from the indentation to a radially outer side of the turbine shaft with respect to an axis of rotation of the gas turbine engine and to the spline connection for transporting oil from the indentation to the radially outer side of the turbine shaft and to the spline connection as the turbine shaft rotates.

2. The gas turbine engine according to claim 1, wherein the indentation is a groove which is continuous in a circumferential direction with respect to the axis of rotation.

3. The gas turbine engine according to claim 1, wherein the at least one bore includes a plurality of bores which extend from the indentation to the radially outer side of the turbine shaft, wherein the plurality of bores are arranged equidistantly in a circumferential direction with respect to the axis of rotation.

4. The gas turbine engine according to claim 1, wherein the at least one bore includes a plurality of bores which extend from the indentation to the radially outer side of the turbine shaft, wherein the plurality of bores are arranged one behind another in an axial direction with respect to the axis of rotation.

5. The gas turbine engine according to claim 1, wherein the indentation is positioned axially such that the at least one bore ends in a sealed-off region of the spline connection.

6. The gas turbine engine according to claim 1, further comprising:
   an axially front seal element in front of the spline connection;
   an axially rear seal element aft of the spline connection; and
   wherein the indentation is positioned axially between the axially front seal element and the axially rear seal element.

7. The gas turbine engine according to claim 6, wherein the spline connection further comprises a toothing region and wherein the indentation is axially in front of the toothing region.

8. The gas turbine engine according to claim 1, further comprising an oil applicator through which oil is introduced into the indentation.

9. The gas turbine engine according to claim 1, further comprising an oil applicator oriented and positioned such that oil is sprayed directly into the indentation.

10. The gas turbine engine according to claim 1, further comprising an oil applicator oriented and positioned such that oil is introduced indirectly into the indentation.

11. The gas turbine engine according to claim 10, further comprising an inner shaft arranged radially inside the turbine shaft, wherein the oil applicator is oriented and positioned such that oil is sprayed onto the inner shaft and oil is one chosen from rebounded and centrifuged from the inner shaft into the indentation.

12. The gas turbine engine according to claim 11, wherein the inner shaft includes an inner indentation into which the oil applicator sprays oil, wherein the inner indentation is situated, at a same axial position, radially opposite the indentation of the turbine shaft.

13. The gas turbine engine according to claim 12, wherein the indentation of the inner shaft is a groove.

14. The gas turbine engine according to claim 1,
   wherein the turbine is a first turbine, the compressor is a first compressor and the turbine shaft is a first turbine shaft;
   wherein the engine core further comprises a second turbine, a second compressor and a second turbine shaft, which connects the second turbine to the second compressor; and
   wherein the second turbine, the second compressor and the second turbine shaft are arranged to rotate at a higher rotational speed than the first turbine shaft.

15. A gearbox arrangement comprising:
   a drive shaft formed as a hollow shaft;
   an output element which is driven by the drive shaft;

a shaft-hub connection which is lubricated with oil, wherein the drive shaft and the output element are connected to one another by the shaft-hub connection;

wherein the drive shaft includes an indentation on a radially inner side of the drive shaft with respect to a rotational axis of the drive shaft for receiving oil, and wherein the drive shaft includes a bore which extends from the indentation to a radially outer side of the drive shaft and to the shaft-hub connection for transporting oil from the indentation to the radially outer side of the drive shaft and to the shaft-hub connection as the drive shaft rotates.

16. The gearbox arrangement according to claim 15, wherein the indentation is a groove which is continuous in a circumferential direction with respect to the rotational axis.

17. The gearbox arrangement according to claim 15, further comprising:

an axially front seal element in front of the shaft-hub connection;
an axially rear seal element aft of the shaft-hub connection; and
wherein the indentation is positioned axially so as to be situated axially between the axially front seal element and the axially rear seal element.

18. The gearbox arrangement according to claim 15, further comprising an oil applicator through which oil is sprayed into the indentation, wherein the oil applicator is oriented and positioned such that oil is sprayed directly into the indentation.

19. The gearbox arrangement according to claim 15, further comprising:

an inner shaft arranged radially inside the drive shaft; and
an oil applicator through which oil is sprayed into the indentation, wherein the oil applicator is oriented and positioned such that oil is sprayed onto the inner shaft and one chosen from rebounds and is centrifuged from the inner shaft into the indentation.

20. A method for introducing oil into a gearbox arrangement comprising:

providing:
a drive shaft, including a hollow shaft, an indentation on a radially inner side of the drive shaft, and a bore extending from the indentation to a radially outer side of the drive shaft;
an output element;
a shaft-hub connection connecting the drive shaft and the output element; and
a seal region in which the shaft-hub connection is sealed off;
introducing oil into the indentation;
transporting oil from the indentation through the bore to the radially outer side of the drive shaft and to the shaft-hub connection as the drive shaft rotates, wherein the oil is fed to the seal region.

* * * * *